Figure 1:
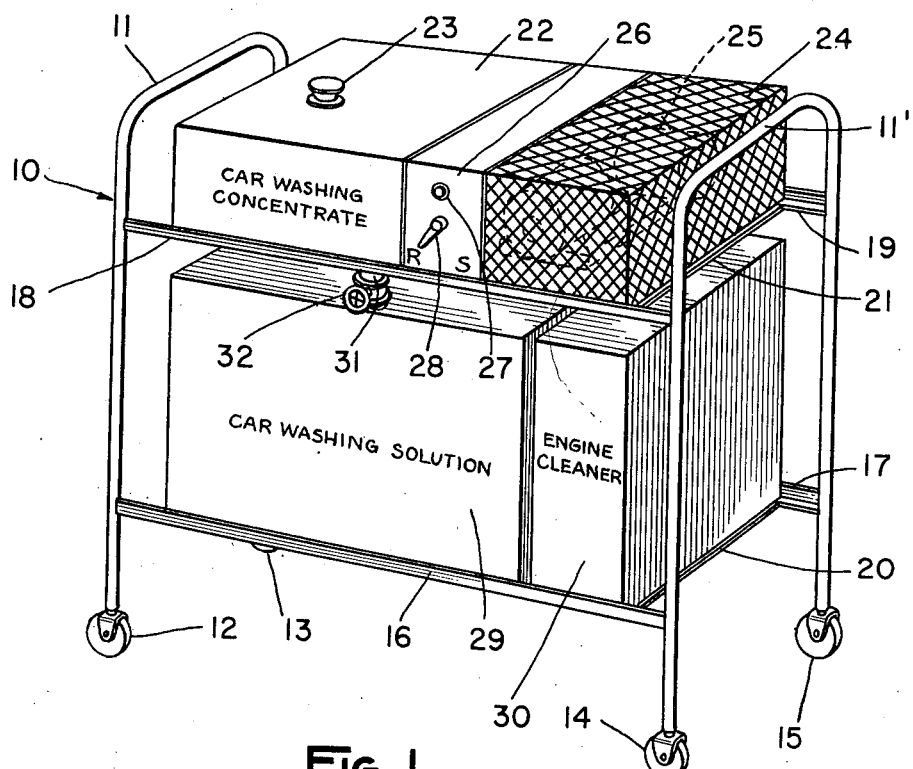

June 5, 1962          C. B. LIGON          3,037,707

CAR WASHING APPARATUS

Filed Sept. 22, 1959

INVENTOR.
CHARLES B. LIGON
BY
Elliott & Pastoriza
ATTORNEYS

United States Patent Office 3,037,707
Patented June 5, 1962

3,037,707
CAR WASHING APPARATUS
Charles B. Ligon, 2318 Pico Blvd., Santa Monica, Calif.
Filed Sept. 22, 1959, Ser. No. 841,541
4 Claims. (Cl. 239—310)

This invention generally relates to a car washing apparatus, and more particularly concerns car washing apparatus of the semi-automatic type designed to employ pressurized water and air inlet lines normally available in car servicing locations. The invention also embodies in one form thereof engine cleaning apparatus in combination with the car washing apparatus.

As a consequence of the unusually high increase of automobiles in use throughout the United States, the former method of washing cars with a conventional hose and sponge has been replaced to a great extent by various types of mechanical and electro-mechanical car washing structures designed for efficient and quick automatic washing of cars with a minimum requirement of manual labor. Thus, many business enterprises consist solely of performing such car washing services on a high volume basis.

The present invention, however, is directed toward businesses in which car washing is an auxiliary or supplemental service, for example, in connection with service stations, used car lots, new car dealers, automobile repair shops and the like. In these particular businesses, a need has developed for an economical and efficient semi-automatic car washing apparatus which will save time in the washing of cars, and yet which will not be as cumbersome and expensive as the larger structures primarily designed for solely high volume car washing businesses.

It is therefore an object of the present invention to provide an improved car washing apparatus enabling a substantial savings in time in car washing operations compared to former completely manual methods, and yet which is easy to operate and may be efficiently employed on an economical basis.

Another object of the present invention is to provide an improved car washing apparatus which is ruggedly constructed of a minimum number of parts, and which is of a relatively light weight facilitating portability.

Another object of the present invention is to provide an improved car washing apparatus which may be advantageously employed with conventional water and air outlets provided in service stations and other similar automobile servicing businesses.

Another object of the present invention is to provide an improved car washing apparatus which is so designed such that the car may not only be soaped or shampooed but also such that the car may be rinsed by employing the same apparatus.

Still another object of the present invention is to provide an improved car washing apparatus which also preferably embodies structural components such that it may be used also for the purpose of replacing engine cleaning apparatus.

Still a further object of the present invention is to provide an improved car washing apparatus which may be simply and easily operated by one man, and which does not require any appreciable maintenance.

These and other objects and advantages of the present invention are generally attained by providing a car washing apparatus comprising a frame on which tank means are mounted to retain a car washing solution. A water inlet line has a first branch line communicating with the tank means.

A float valve means is interposed in the first branch line for opening and closing the first branch line in response to a variation of the level of the solution within the tank means.

A two position three-way valve means is associated with the apparatus, and the water inlet line has a second branch line communicating with one of the inlets to the three-way valve means. A fluid outlet line communicates with the other side of the three-way valve means.

A solution outlet line communicates between the tank and the other inlet to the three way valve means, and a pump means is interposed in the solution outlet line.

In a preferred construction, a re-circulating line communicates between the solution outlet line and the tank means down-stream of the pump means, and desirably the re-circulating line has a relatively high resistance to fluid flow.

With such a construction, in a first position of the three-way valve means, the fluid outlet line will be connected directly to the first branch line of the water inlet line such that the pump re-circulates fluid from the solution outlet line to the tank means. In a second position of the three-way valve means, the solution outlet line will be connected to the fluid outlet line, whereby only a portion of the solution outlet line is so re-circulated.

In addition to the water inlet line, it is also desirable to provide conduit elements in the apparatus for communicating with a pressurized air line wtih the other end of the conduit elements communicating with the fluid outlet line on the downstream side of the three-way valve means. With such a construction, the high pressure air line will mix with either the solution passing through the fluid outlet line or with the water whereby a very effective pressurized spray is attained either for soaping or rinsing purposes.

Figure 2:
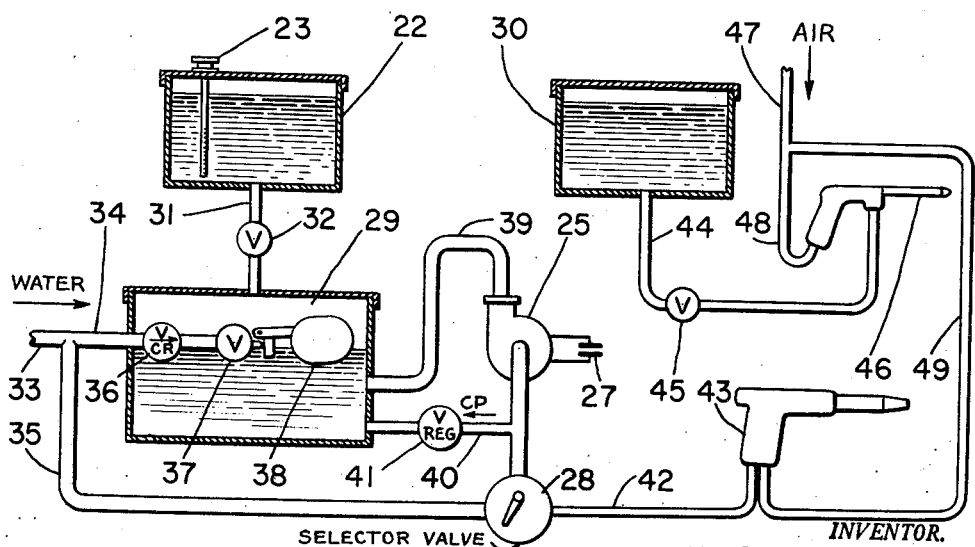

A better understanding of the present invention will be had by reference to the drawings, illustrating merely a preferred embodiment, and in which:

FIGURE 1 is an isometric view of the car washing apparatus of the present invention; and FIGURE 2 is a schematic diagram illustrating the various components shown in FIGURE 1 in combination with other fluid circuit elements.

Referring now to the drawings, there is shown in FIGURE 1 a portable frame structure generally designated by the numeral 10. The frame structure 10 includes at the opposite ends thereof inverted U-shaped members 11 and 11', which may be grasped by the operator for moving the frame 10 from place to place according to where the car washing operations are being performed. Towards the end of portability, the member 11 is provided with casters 12 and 13; similarly, the U-shaped member 11' is provided with casters 14 and 15. Of course, wheels or other conveying means could also be employed.

Inter-connecting the members 11 and 11' are a pair of lower longitudinal frame members 16 and 17, which preferably are angle members facing inwardly. Similarly, another pair of longitudinal frame members 18 and 19 inter-couple the upper portions of the members 11 and 11' and are also preferably of angled construction. It is also desirable to provide lower lateral frame members 20 inter-connecting longitudinal frame members 16 and 17, one such lateral frame member 20 being provided adjacent each of the members 11 and 11', although only one is shown in the drawing. Similarly, lateral frame members 21 inter-connect longitudinal frame members 18 and 19 in analogous locations, although again only one is shown in the drawing.

The frame members 18 and 19 not only serve to stabilize the general frame construction 10 but serve as a means of supporting the tank means 22 designed to receive car washing detergent concentrate, as indicated. It is desirable that tank 22 be provided with a combined closure and tank fluid measuring stick 23 whereby fluid may be received in the tank 22 and an indication of the level of fluid therein may be manually attained.

Adjacent the member 11' is mounted a screen enclosure 24 which has disposed therein a pumping unit 25 suitably supported from the frame members 18, 19, and 21. Interposed between the tank 22 and the enclosure 24 is a panel structure 26, which is designed to receive a push button unit 27 for actuating the pump 25, as well as a valve switching unit 28, the purpose of which will become clearer as the specification proceeds.

On the lower frame members 16 and 17 are disposed a car washing solution tank 29 and an engine cleaner solution tank 30. Desirably, a line 31 is connected directly from the concentrate detergent tank 22 to the car washing solution tank 29. The line 31 is provided with a valve 32 which may be manually actuated in accordance with the operation of the improved car washing apparatus as will be hereafter described.

A clearer understanding of the functions and operation of the improved car washing apparatus of the present invention will be had by reference to FIGURE 2. In FIGURE 2, there is shown a main water inlet line 33 which is designed for coupling to a conventional water outlet or source of water provided in a service station or the like. The inlet line 33 branches off into a first branch line 34 and a second branch line 35. The first branch line 34 communicates through check valve means 36 to a float valve 37, the latter being coupled for actuation with a float unit 38. The float valve 37 and float unit 38 may be of conventional construction, such as employed for example in conjunction with toilet bowl units.

The car washing solution tank 29 has an outlet line 39 connected thereto. The solution outlet line 39 has interposed therein the pump means 25, hereinbefore referred to, and terminates on the inlet side of the valve means 28, also previously identified.

Between the solution outlet line 39 and the tank means 29 there is disposed a re-circulating line 40 having disposed therein a constant pressure regulating valve 41.

It will also be seen that the second branch line 35 of the water inlet line communicates with an inlet side of the selective valve means 28.

On the other side of the selective valve means, there is disposed a fluid outlet line 42 which communicates with a conventional hydro-air gun 43.

From the engine cleaner tank 30, there is connected an outlet line 44 having interposed therein a valve 45. The outlet line 44 leads directly to a venturi-type gun 46. The gun 46 is operated by air pressure which draws fluid from the tank 30.

Towards this end, an air inlet line 47 is designed for coupling to a conventional air compressor source in service stations or the like. The air inlet line 47 branches off into a first line 48 communicating directly with the gun 46 for the actuation thereof. Another air branch line 49 communicates with the gun 43 as heretofore mentioned.

In operation, assuming that the car body is first to be washed, the push button 27 is initially actuated to start the operation of the pump 25. Selective valve 28 is then switched to the position "S," as shown in FIGURE 1, to connect the line 39 with the fluid outlet line 42. Relative to the latter operation, the selector valve means or switch 28 preferably comprises a two position, three-way valve unit. Of course, the gun 43 is preferably always connected to the air inlet line 47 through the line 49, whereby mere actuation of the gun will cause pressurized air to flow therethrough.

As a consequence, as soon as the gun 43 is actuated to open the end of the line 42 therein, the pump 25 will cause solution from the tank 29 to be forced into the gun 43. The solution from the tank 29 will thereafter mix with the air to be exhausted from the gun 43 in the form of a relatively high pressure spray of a solution-air mixture.

It will be appreciated that although the solution outlet line 39 is connected to the fluid outlet line 42 by the "S" position of the selector valve 28, nevertheless, the line 40 is still open between the tank 29 and the solution outlet line 39. However, the pressure regulating valve 41 prevents flow therethrough until a certain degree of pressure has been attained assuring that a major portion of the solution will continue to flow into the fluid outlet line 42. A minor portion thereof, however, will be re-circulated back into the tank 29 through the line 40.

The solution passing from the line 39 back through the line 40 into the tank 29 serves to mix and agitate the detergent solution in the tank 29 such that it will always be in a foamed, soapy condition as it is withdrawn from the tank 29 by the pump 25 into the fluid outlet line 42.

The float 38 and float valve 37 serve as a conventional means of maintaining a proper level of solution within the tank 29 by allowing water to pass through the branch line 34 into the tank 29 in the event the level of solution therein drops. In addition, the valve 32 allows the operator to permit a certain amount of detergent to pass downwardly from the concentrate tank 22 into the solution tank 29 by merely cracking the valve 32 every so often. Of course, an automatic valve opening apparatus could be employed in place of the manual control valve 32. However, it has been found that different operators desire different amounts of detergent in the ultimate solution, and thus, it is more convenient to provide a manual control valve 32 as a means of allowing detergent from the tank 22 to be mixed in the solution tank 29. With such a construction, the tank 22 may hold enough detergent concentrate for several weeks of operation with the valve 32 merely being cracked every time 3 or 4 cars have been washed to allow a small quantity of detergent to pass into the solution tank 29.

As soon as the car has been properly soaped or shampooed, the selector valve 28 may be switched to the "R" position for rinsing purposes. In such position, the selector valve will connect the water inlet branch line 35 to the fluid outlet line 42 and shut off line 39. As a consequence, water will pass directly from the inlet line 35 to the fluid outlet line 42 to mix only with the air coming in through the lines 47 and 49 to the gun 43. At the same time, however, the pump 25 may be allowed to continue to operate such that solution will be pumped from the tank 29 back through the line 40 and thus re-circulated to keep the solution in the tank 29 in a foamed, soapy condition for the next car body washing operation.

As soon as the car body has been cleaned, the operator may employ the other gun 46 for cleaning the engine. Since the gun 46 operates on a venturi "suction" principle, no pump is required. Thus the air passing through line 48 into the gun 46 will create a low pressure area tending to withdraw the engine cleaning detergent from the tank 30 into the line 44 through the valve means 45 and thus into the gun 46.

The particular guns 43 and 46 employed may be of conventional construction and are not deemed to form a part of the present invention except in so far as they function together with the overall combinations described.

It is also to be noted that the particular frame structure 10 and the manner in which the various tanks and other components are mounted thereon may be varied to meet individual requirements. However, the construction shown is preferred.

It will thus be appreciated that many modifications and changes may be made to the car washing apparatus of the present invention without departing from the spirit and scope thereof.

Additionally, it should be incidentally mentioned that in some instances throughout the specification, the words "car washing apparatus" have been used and are deemed to include the engine cleaning component elements as well.

What is claimed is:

1. A car washing apparatus comprising: a frame; tank means mounted on said frame, said tank means being designed to retain a car washing solution; a water inlet line, said water inlet line having a first branch line communicating with said tank means; float valve means interposed in said first branch line for opening and closing said first branch line in response to variations in the level of said solution in said tank means; valve means, said water inlet line having a second branch line communicating with one side of said valve means; a fluid outlet line communicating with the other side of said valve means; a solution outlet line communicating between said tank means and said one side of said valve means; a pump means interposed in said solution outlet line, said valve means having two positions and being designed so that in a first position it will connect said fluid outlet line directly to said second branch line of said water inlet line, and being designed so that in a second position it will connect said solution outlet line to said fluid outlet line; gun means communicating with the end of said fluid outlet line; and, a high pressure air line communicating with said gun means.

2. A car washing apparatus comprisng: a frame; tank means mounted on said frame, said tank means being designed to retain car washing solution; a water inlet line, said water inlet line having a first branch line communicating with said tank means; float valve means interposed in said first branch line for opening and closing said first branch line in response to variations in the level of said solution in said tank means; valve means, said water inlet line having a second branch line communicating with one side of said valve means; a fluid outlet line communicating with the other side of said valve means; a solution outlet line communicating between said tank and said one side of said valve means; a pump means interposed in said solution outlet line; a re-circulating line communicating between said solution outlet line and said tank means downstream of said pump means, said re-circulating line having a relatively high flow resistance, said valve means having two positions and being designed in a first position to connect said fluid outlet line directly to said second branch line of said water inlet line such that said pump re-circulates from said solution outlet line to said tank means through said re-circulating line, and being designed in a second position, to connect said solution outlet line to said fluid outlet line, whereby only a portion of said solution is so re-circulated; gun means communicating with the end of said fluid outlet line; and, a high pressure air line communicating with said gun means.

3. A car washing apparatus, according to claim 2; an auxiliary tank means mounted on said frame adapted to retain solution concentrate; a feed line communicating between said auxiliary tank means and said first mentioned tank means; and, a valve means in said feed line.

4. A car washing apparatus, according to claim 2, and a constant pressure valve means in said re-circulating line, whereby flow therethrough is prevented until a given pressure is attained.

References Cited in the file of this patent
UNITED STATES PATENTS

| | | |
|---|---|---|
| 1,448,910 | Bolger | Mar. 20, 1923 |
| 1,677,645 | Luthander | July 17, 1928 |
| 2,290,350 | Olches | July 21, 1942 |
| 2,301,691 | Ellinger et al. | Nov. 10, 1942 |
| 2,309,247 | Johnson | Jan. 26, 1943 |
| 2,640,724 | Sanders et al. | June 2, 1953 |
| 2,692,798 | Hicks | Oct. 26, 1954 |
| 2,861,838 | Wyatt et al. | Nov. 25, 1958 |